US008036981B2

(12) United States Patent (10) Patent No.: US 8,036,981 B2
Shirey et al. (45) Date of Patent: *Oct. 11, 2011

(54) SYSTEM AND APPARATUS FOR TRANSACTION FRAUD PROCESSING

(75) Inventors: John Earl Shirey, Atkinson, NH (US); Tonya Lin Carroll, Merrimack, NH (US)

(73) Assignee: Paymentech LP, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/697,915

(22) Filed: Feb. 1, 2010

(65) Prior Publication Data

US 2010/0138340 A1 Jun. 3, 2010

Related U.S. Application Data

(62) Division of application No. 10/247,412, filed on Sep. 19, 2002, now Pat. No. 7,657,482.

(51) Int. Cl.
*G06Q 40/00* (2006.01)
(52) U.S. Cl. .............................. 705/38; 705/39; 705/40
(58) Field of Classification Search ................ 705/38, 705/39, 40
See application file for complete search history.

(56) References Cited

U.S. PATENT DOCUMENTS

| | | | |
|---|---|---|---|
| 3,786,439 A | 1/1974 | McDonald et al. | |
| 5,621,670 A | 4/1997 | Maeda et al. | |
| 5,956,700 A | 9/1999 | Landry | |
| 7,096,363 B2 | 8/2006 | Kon et al. | |
| 7,139,731 B1 | 11/2006 | Alvin | |
| 7,263,506 B2 | 8/2007 | Lee et al. | |
| 7,376,618 B1 * | 5/2008 | Anderson et al. | 705/38 |
| 7,403,922 B1 | 7/2008 | Lewis et al. | |
| 2001/0001877 A1 | 5/2001 | French et al. | |
| 2002/0099649 A1 | 7/2002 | Lee et al. | |
| 2002/0120559 A1 | 8/2002 | O'Mara et al. | |
| 2002/0166090 A1 | 11/2002 | Maeda et al. | |
| 2002/0194119 A1 | 12/2002 | Wright et al. | |
| 2002/0198798 A1 | 12/2002 | Ludwig et al. | |
| 2003/0055754 A1 | 3/2003 | Sullivan | |
| 2003/0154406 A1 | 8/2003 | Honarvar et al. | |
| 2004/0078328 A1 | 4/2004 | Talbert et al. | |

* cited by examiner

*Primary Examiner* — Jagdish Patel
(74) *Attorney, Agent, or Firm* — Jackson Walker L.L.P.; Christopher J. Rourk

(57) ABSTRACT

A system for processing transaction data is provided. The system includes a fraud policy system that provides merchant fraud policy data. An order information data system receives order information data and the merchant fraud policy data and generates order information fraud score data, such as by modifying the order information data using the merchant fraud policy data and then scoring the modified order information data. A transaction authorization system receives the order information fraud score data and the merchant fraud policy data and generates client authorization data.

20 Claims, 3 Drawing Sheets ature numerals, respectively. The drawing figures may not
SYSTEM AND APPARATUS FOR TRANSACTION FRAUD PROCESSING

RELATED APPLICATIONS

This application is a divisional application of U.S. Serial No. 10/247,412, filed Sep. 19, 2002, entitled "SYSTEM AND APPARATUS FOR TRANSACTION FRAUD PROCESSING," which is related to copending U.S. application Ser. No. 10/196,586, entitled "SYSTEM AND APPARATUS FOR TRANSACTION DATA FORMAT AND FUNCTION VERIFICATION," filed Jul. 15, 2002, both of which are hereby incorporated by reference for all purposes.

FIELD OF THE INVENTION

The present invention pertains to the field of transaction data processing. More specifically, the invention relates to a system and apparatus for transaction fraud processing that allows different fraud rules for each of a plurality of merchants to be modified from a central location.

BACKGROUND

Transaction fraud processing systems are known in the art. Such transaction fraud processing systems receive transaction data from merchants and generate a fraud score. The merchant then uses the fraud score to determine whether to accept the transaction, decline the transaction, or to request additional data.

While such transaction fraud processing systems perform certain useful functions, the merchant must ensure that the data that has been entered is in the proper format and falls within allowable boundaries for each financial processing system. Each fraud processing system has specialized data formats and functions, which further complicates the processing of transaction fraud data. Furthermore, the merchant must determine whether the transaction fraud data requires action, and must remain up to date with any additional capabilities or modifications to the transaction fraud processor's capabilities and data formats.

SUMMARY OF THE INVENTION

In accordance with the present invention, a system and apparatus for processing transaction data are provided that overcome known problems with processing transaction data.

In particular, a system and apparatus for processing transaction data are provided that facilitate processing of transaction fraud data to allow merchants to receive a simplified score, enhance the scoring functionality and to allow modifications to fraud scoring to be readily accommodated by merchants.

In accordance with an exemplary embodiment of the present invention, a system for processing transaction data is provided. The system includes a fraud policy system that provides merchant specific fraud policy data and functionality. An order information data system receives order information data and the merchant fraud policy data and generates order information fraud score data, such as by modifying the order information data using the merchant fraud policy data and then scoring the modified order information data. A transaction authorization system receives the order information fraud score data and the merchant fraud policy data and generates client authorization data.

The present invention provides many important technical advantages. One important technical advantage of the present invention is a system and apparatus for processing transaction data that allows external or internal fraud processing rules to be changed without requiring merchant internal fraud processing rules to be changed. The present invention also allows merchants to set policies and for changes to be made to fraud processing rules for each merchant based on such policies without having to upgrade fraud processing systems operated by each merchant.

Those skilled in the art will further appreciate the advantages and superior features of the invention together with other important aspects thereof on reading the detailed description that follows in conjunction with the drawings.

DETAILED DESCRIPTION OF PREFERRED EMBODIMENTS

Figure 1:
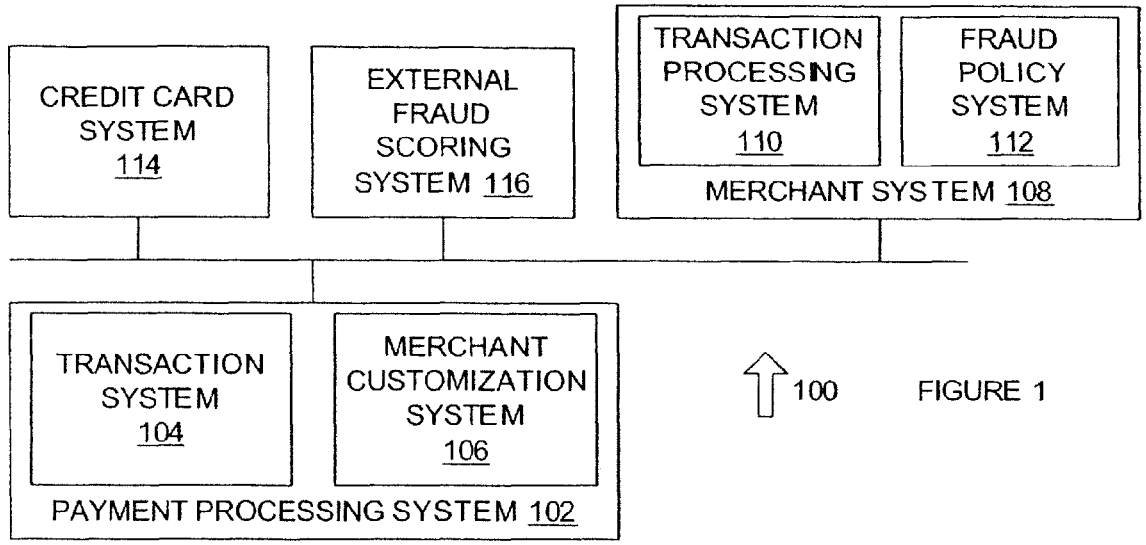
FIG. 1 is a diagram of a system for transaction fraud processing in accordance with an exemplary embodiment of the present invention.

In the description which follows, like parts are marked throughout the specification and drawings with the same reference numerals, respectively. The drawing figures may not be to scale and certain components can be shown in generalized or schematic form and identified by commercial designations in the interest of clarity and conciseness.

FIG. 1 is a diagram of a system 100 for transaction fraud processing in accordance with an exemplary embodiment of the present invention. System 100 allows transaction data to be processed to determine compliance with data formats and rules of fraud scoring systems, transaction processing systems, and other suitable systems, and provides transaction fraud data to merchants in a merchant-usable format.

System 100 includes payment processing system 102, transaction system 104, merchant customization system 106, merchant system 108, transaction processing system 110, fraud policy system 112, credit card system 114, and external fraud scoring system 116, each of which can be implemented in hardware, software, or a suitable combination of hardware and software, and which can be one or more software systems operating on a general purpose processing or server platform. As used herein, a hardware system can include discrete semiconductor devices, an application-specific integrated circuit, a field programmable gate array or other suitable devices. A software system can include one or more objects, agents, threads, lines of code, subroutines, separate software applications, user-readable (source) code, machine-readable (object) code, two or more lines of code in two or more corresponding software applications, databases, or other suitable software architectures. In one exemplary embodiment, a software system can include one or more lines of code in a general purpose software application, such as an operating system, and one or more lines of code in a specific purpose software application.

The systems of system 100 are coupled over communications medium 118. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. In one exemplary embodiment, systems and components are coupled to other systems and components through intervening systems and components, such as through an operating system. Communications medium 118 can be a local area network, a wide area network, a public network such as the Internet, the public switched telephone network, a wireless network, a fiber optic network, other suitable media, or a suitable combination of such media.

Payment processing system 102 receives merchant fraud policy data from merchant system 108. In one exemplary embodiment, the merchant fraud policy data can include selections of one or more rules from available rule sets, customized rules, or other suitable rules based on the types of data that the merchant acquires from its customers or other suitable data. Payment processing system 102 can provide rules that are provided from an external fraud scoring system 116, or other suitable rules, and stores the merchant-specific rules in merchant customization system 106. Fraud policy system 112 of merchant system 108 can be used by the merchant to select and implement the rules, to provide fraud policy data and functionality to payment processing system 102, or to otherwise establish suitable rules.

After fraud processing or policy rules have been established, merchant system 108 sends transaction data to payment processing system 102 through transaction processing system 110, which can be a web server or other suitable transaction processing systems. Transaction system 104 of payment processing system 102 processes the transaction in accordance with one or more predetermined transaction processing rules. In this manner, transaction system 104 performs rules and format verification in accordance with the system and methods described in U.S. patent application Ser. No. 10/196,586 entitled "SYSTEM AND APPARATUS FOR TRANSACTION DATA FORMAT AND FUNCTION VERIFICATION," filed Jul. 15, 2002, which is hereby incorporated by reference for all purposes. Payment processing system 102 uses transaction system 104 and merchant customization system 106 to ensure that transaction data complies with credit card system 114 rules, external fraud scoring system 116 rules, and other suitable rules. Payment processing system 102 notifies merchant system 108 of any irregularities or nonconformities with such transaction data, thus allowing the transaction data to be corrected prior to submission to credit card system 114 and external fraud scoring system 116, or other suitable systems.

If all data format requirements have been met and transaction data rules and fraud policy rules have been complied with, payment processing system 102 can perform an initial fraud determination, such as to determine whether the transaction is a card-not-present transaction or other suitable processes. If the initial fraud determination indicates that the transaction should receive additional fraud processing, such as where the merchant requests such processing, the transaction data can be transmitted to external fraud scoring system 116. Payment processing system 102 can process the transaction data using the merchant policy data, such as to submit transaction data for external fraud scoring, to weight certain types of data fields to have greater significance than others, to request fraud scoring of selected data fields, to ignore certain data fields, to use data fields that are available to that merchant, or to perform other suitable processes. Likewise, internal fraud scoring can be exclusively used, external fraud scoring system 116 can be exclusively used, or other suitable processes or combinations of processes can be performed.

Payment processing system 102 receives fraud scoring data, such as from external fraud scoring system 116, from internal fraud scoring processes, or in other suitable manners. Such fraud scoring can include multiple indicators, such that additional analysis can be required. Payment processing system 102 can retrieve the merchant fraud policy data from merchant customization system 106 and can perform additional rules implementation on the fraud scoring data. In one exemplary embodiment, an external fraud scoring system 116 may generate a fraud score between 1 and 999, where merchant customization system 106 is used to set ranges for scores that indicate a negative result, a positive result, and results requiring additional investigation. External fraud scoring system 116 can also generate one or more codes, where codes that indicate an authorized transaction, and unauthorized transaction, and a transaction that requires additional verification can be selected based on the merchant policy data.

Payment processing system 102 can then provide the fraud scoring data and transaction data to merchant system 108 for transaction processing based on the results from external fraud scoring system 116 and the merchant customization system 106. In one exemplary embodiment, the transaction data provided to external fraud scoring system 116 is different from the transaction data provided to credit card system 114. The transaction data, fraud scoring data, or other suitable data can then be provided to merchant system 108.

In operation, system 100 allows transaction data to be processed to detect fraudulent transactions. System 100 allows fraud scoring from internal or external processes to be used, and simplifies the merchant interface with a fraud scoring system by allowing new fraud scoring data to be introduced for use in the fraud scoring system without requiring the merchant to modify payment processing systems to accommodate the new fraud scoring data. System 100 also allows fraud rules, transaction rules, data formats, or other suitable data and decision logic to be implemented for different merchants, credit card systems 114, external fraud scoring systems 116, or other suitable systems or processes, such that data format and rule verification processing is provided. In this exemplary embodiment, transaction data received from merchant systems 108 is verified both for data field correctness and for compliance with rules, where the actual data values are checked to verify that they are within allowable ranges, types, sets, classes, or are otherwise allowable or will not result in error messages from credit card system 114, external fraud scoring system 116, or other systems.

Figure 2:
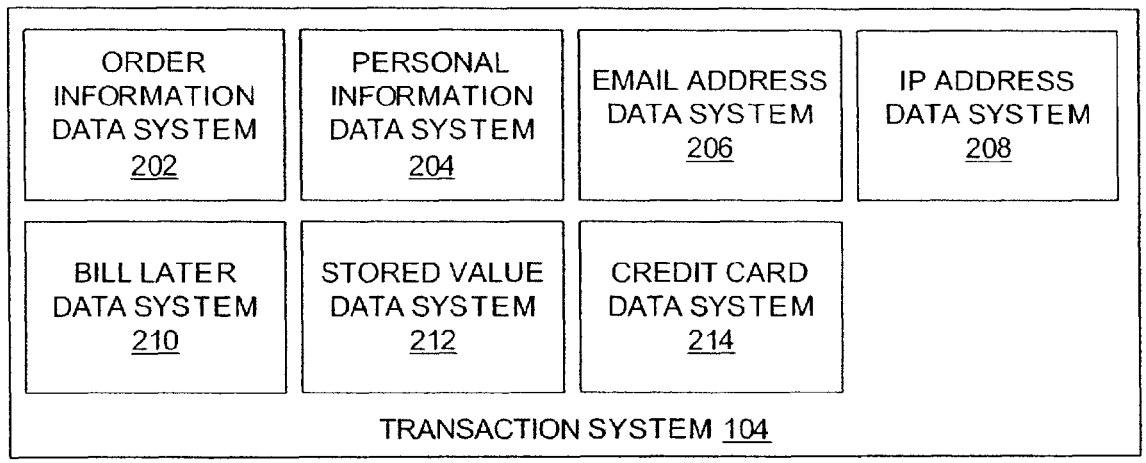
FIG. 2 is a diagram of a system for providing transaction data format, fraud data format, and rules processing capability in accordance with an exemplary embodiment of the present invention.

FIG. 2 is a diagram of a system 200 for providing transaction data format, fraud data format, and rules processing capability in accordance with an exemplary embodiment of the present invention. System 200 includes transaction system 104 and order information data system 202, personal information data system 204, email address data system 206, IP address data system 208, bill later data system 210, stored value data system 212, and credit card data system 214 each of which can be implemented in hardware, software, or a suitable combination of hardware and software, and which can be one or more software systems operating on a general purpose processing platform.

Order information data system 202 provides order information data in a predetermined format, where data types allowable for the format are based on data types required by credit card systems 114, external fraud scoring systems 116, or other suitable systems or functions. In one exemplary embodiment, order information data system 202 can verify that the data is in the proper format, and can then perform additional data processing on the data fields to identify any problems with data before transmission of the data to an external processing organization. Furthermore, order information data system 202 can implement necessary fixes to such data, such as to correct obvious errors, make corrections based on the context of the data record, or to implement other suitable processes.

In one exemplary embodiment, order information data system 202 can include one or more of the following format fields and functions:

| Length | Field Name | Comments |
|---|---|---|
| 2 | format | E.g. order information format |
| 3 | product delivery type | E.g. cash & carry, digital content/text or images, digital goods, digital and physical, physical delivery required, renewals and recharges, shareware, and service |
| 2 | shipping carrier | E.g. DHL, Federal Express, Greyhound, Purolator, USPS, or United Parcel Service |
| 1 | shipping method | E.g. lowest cost, carrier designated by customer, international, military, next day/overnight, store pickup, or two day service |
| 6 | Order Date | E.g. date of order |
| 6 | Order Time | E.g. time of order |

Personal information data system 204 provides personal information data in a predetermined format, where data types allowable for the format are based on data types required by credit card systems 114, external fraud scoring systems 116, or other suitable systems or functions. In one exemplary embodiment, personal information data system 204 can verify that the data is in the proper format, and can then perform additional data processing on the data fields to identify any problems with data before transmission of the data to an external processing organization. Furthermore, personal information data system 204 can implement necessary fixes to such data, such as to correct obvious errors, make corrections based on the context of the data record, or to implement other suitable processes.

In one exemplary embodiment, personal information data system 204 can include one or more of the following format fields and functions:

| Length | Field Name | Comments |
|---|---|---|
| 2 | format indicator | E.g. personal information format |
| 8 | date of birth | E.g. date of birth |
| 9 | social security number | E.g. social security number |
| 3 | currency type | E.g. currency type of gross household annual income |
| 10 | gross income | E.g. gross household income |
| 1 | residence status | E.g. rent, own |
| 2 | years at residence | E.g. number of years at current residence |
| 2 | years at employer | E.g. number of years worked with current employer |
| 1 | checking account | E.g. checking account indicator |
| 1 | savings account | E.g. savings account indicator |

E-mail address data system 206 provides e-mail data in a predetermined format, where data types allowable for the format are based on data types required by credit card systems 114, external fraud scoring systems 116, or other suitable systems or functions. In one exemplary embodiment, e-mail data system 206 can verify that the data is in the proper format, and can then perform additional data processing on the data fields to identify any problems with data before transmission of the data to an external processing organization. Furthermore, e-mail data system 206 can implement necessary fixes to such data, such as to correct obvious errors, make corrections based on the context of the data record, or to implement other suitable processes.

In one exemplary embodiment, e-mail data system 206 can include one or more of the following format fields and functions:

| Length | Field Name | Definition |
|---|---|---|
| 2 | format indicator | E.g. e-mail address information |
| 1 | address type | E.g. buyer address, giftee address |
| N | e-mail address | E.g. e-mail address |

IP address data system 208 provides IP address data in a predetermined format, where data types allowable for the format are based on data types required by credit card systems 114, external fraud scoring systems 116, or other suitable systems or functions. In one exemplary embodiment, IP address data system 208 can verify that the data is in the proper format, and can then perform additional data processing on the data fields to identify any problems with data before transmission of the data to an external processing organization. Furthermore, IP address data system 208 can implement necessary fixes to such data, such as to correct obvious errors, make corrections based on the context of the data record, or to implement other suitable processes.

In one exemplary embodiment, IP address data system 208 can include one or more of the following format fields and functions:

| Length | Field Name | Definition |
|---|---|---|
| 2 | format indicator | E.g. IP address information |
| 1 | address Subtype | E.g. bill to address, buyer address |
| N | customer IP address | E.g. customer's IP address |

Bill later data system 210 provides bill me later program data in a predetermined format, where data types allowable for the format are based on data types required by credit card systems 114, external fraud scoring systems 116, or other suitable systems or functions. In one exemplary embodiment, bill later data system 210 can verify that the data is in the proper format, and can then perform additional data processing on the data fields to identify any problems with data before transmission of the data to an external processing organization. Furthermore, bill later data system 210 can implement necessary fixes to such data, such as to correct obvious errors, make corrections based on the context of the data record, or to implement other suitable processes.

In one exemplary embodiment, bill later data system 210 can include one or more of the following format fields and functions:

| Length | Field Name | Comments |
| --- | --- | --- |
| 2 | format indicator | E.g. bill later format |
| 8 | shipping cost | E.g. total shipping cost |
| 5 | T&C version | E.g. terms & conditions version |
| 8 | customer registration date | E.g. date customer registered with merchant |
| 2 | customer type flag | E.g. new, existing |
| 4 | item category | product description code assigned by bill later program |
| 16 | pre-approval invitation number | E.g. whether consumer has been pre-approved |
| 4 | merchant promotional code | E.g. merchant promotional code |
| 1 | customer password change | E.g. customer changed password |
| 1 | customer billing address change | E.g. customer changed billing address |
| 1 | customer e-mail change | E.g. customer e-mail change |
| 1 | customer phone change | E.g. customer changed phone number |

Stored value data system 212 provides stored value data in a predetermined format, where data types allowable for the format are based on data types required by credit card systems 114, external fraud scoring systems 116, or other suitable systems or functions. In one exemplary embodiment, stored value data system 212 can verify that the data is in the proper format, and can then perform additional data processing on the data fields to identify any problems with data before transmission of the data to an external processing organization. Furthermore, stored value data system 212 can implement necessary fixes to such data, such as to correct obvious errors, make corrections based on the context of the data record, or to implement other suitable processes.

In one exemplary embodiment, stored value data system 212 can include one or more of the following format fields and functions:

| Length | Field Name | Comments |
| --- | --- | --- |
| 2 | format indicator | E.g. stored value format |
| 1 | telephone type | E.g. day, home, night, work |
| 14 | telephone number | E.g. area code, exchange, number, extension |
| 30 | name text | E.g. name of person receiving gift |
| 30 | address | E.g. street address |
| 28 | address | E.g. street address |
| 2 | country code | E.g. United States, Canada, Mexico |
| 20 | city | E.g. city |
| 2 | state | E.g. state |
| 10 | zip code | E.g. zip code |

Credit card data system 214 provides credit card data in a predetermined format, where data types allowable for the format are based on data types required by credit card systems 114, external fraud scoring systems 116, or other suitable systems or functions. In one exemplary embodiment, credit card data system 214 can verify that the data is in the proper format, and can then perform additional data processing on the data fields to identify any problems with data before transmission of the data to an external processing organization. Furthermore, credit card data system 214 can implement necessary fixes to such data, such as to correct obvious errors, make corrections based on the context of the data record, or to implement other suitable processes.

In one exemplary embodiment, credit card data system 214 can include one or more of the following format fields and functions:

| Length | Field Name | Comments |
| --- | --- | --- |
| 16 | merchant order number | E.g. identifier assigned to customer order |
| 2 | method of payment | E.g. the form of payment provided by the customer |
| 19 | account number | E.g. the payment account identifier |
| 4 | expiration date | E.g. date the account may expire |
| 6 | merchant number | E.g. identifier of merchant |
| 12 | amount | E.g. transaction value |
| 3 | currency code | E.g currency of the transaction |
| 1 | transaction type | E.g. indicator of the source of the transaction - retail store, catalog, Internet, et al |

In operation, system 200 allows data formats and rules for external transaction data processing systems, transaction fraud scoring systems, or other suitable systems to be implemented. In one exemplary embodiment, system 200 determines whether the proper format and the proper data values for such external systems have been implemented. System 200 then interfaces with the external systems, and translates as necessary between such external systems and merchant systems and internal systems.

Figure 3:
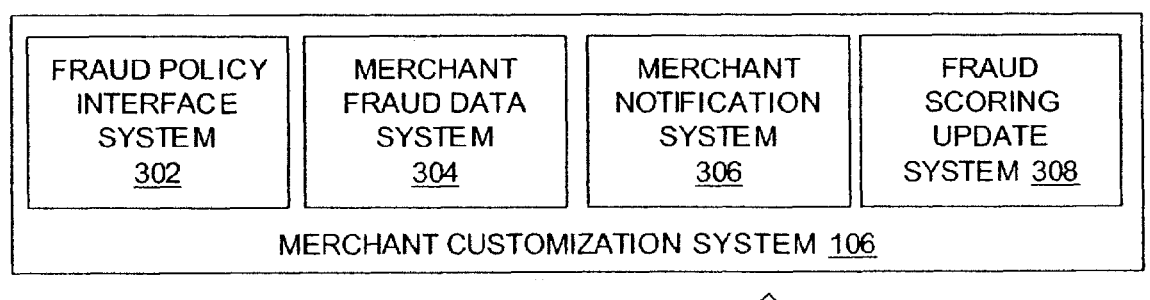
FIG. 3 is a diagram of a system for merchant customization of transaction fraud processing in accordance with an exemplary embodiment of the present invention.

FIG. 3 is a diagram of a system 300 for merchant customization of transaction fraud processing in accordance with an exemplary embodiment of the present invention. System 300 includes merchant customization system 106 and fraud policy interface system 302, merchant fraud data system 304, merchant notification system 306, and fraud scoring update system 308, each of which can be implemented in hardware, software, or a suitable combination of hardware and software, and which can be one or more software systems operating on a general purpose processing platform.

Fraud policy interface system 302 receives fraud policy data from a merchant. In one exemplary embodiment, fraud policy interface system 302 can allow a merchant to operate a fraud policy system 112 and to provide the fraud data on demand or in other suitable manners. Likewise, fraud policy interface system 302 can be operator-driven, where a local operator of system 300 interfaces with a merchant representative via telephone, e-mail or other suitable communications media, reviews merchant fraud policy data previously provided, or otherwise obtains fraud policy data.

Merchant fraud data system 304 stores merchant fraud policy data and decision logic functionality for use in processing transactions. In one exemplary embodiment, merchant fraud data system 304 allows each merchant to customize transaction processing rules to accommodate data obtained by the merchant, such as order information data, personal information data, e-mail address data, IP address data, bill later data, stored value data, credit card data or other suitable data. Merchant fraud data system 304 can further allow fraud scoring data received from an internal or external fraud scoring system to be processed so as to reduce the fraud scoring data to acceptable data classes. In one exemplary embodiment, the fraud scoring data can include an initial score from 1 to 999, and merchant fraud data system 304 can identify ranges for scores to classify the fraud scoring data into classes such as "low risk transaction," "high risk transaction," "medium risk transaction."

Merchant notification system 306 notifies merchant system 108 of changes to fraud scoring data formats. In one exemplary embodiment, additional fraud scoring functionality can be provided, such as based on order information data, personal information data, email address data, IP address data, bill later data, stored value data, credit card data or other suitable data. Merchant notification system 306 can request a merchant to indicate whether any such additional data could be of use in processing transactions to identify fraudulent transactions, can notify a merchant of such changes when previous instructions from a merchant have authorized modification to merchant rules for processing transactions, and can perform other suitable functions.

Fraud scoring update system 308 receives fraud scoring update data, such as from external fraud scoring system 116 or other suitable systems, and allows changes to be made to one or more merchant fraud rules or decision logic. In one exemplary embodiment, fraud scoring update system 308 can allow data formats to be changed, new data fields to be used, and can further allow mass changes to merchant fraud data rules so as to eliminate the need for individual changes of rules.

In operation, system 300 allows fraud policy and fraud scoring to be implemented for a plurality of merchants in a centralized location. System 300 allows customized merchant rules to be set up and implemented for transactions processed through a central transaction processing system, such that transactions can be screened for fraud based on each merchant's preferences on an ongoing basis. System 300 thus allows a payment processor to process transaction data and obtain fraud data without the need to treat individual merchants separately, classify merchants who obtain fraud processing for processing through a separate system than merchants who don't receive fraud processing, or implementing other technologically cumbersome processes.

Figure 4:
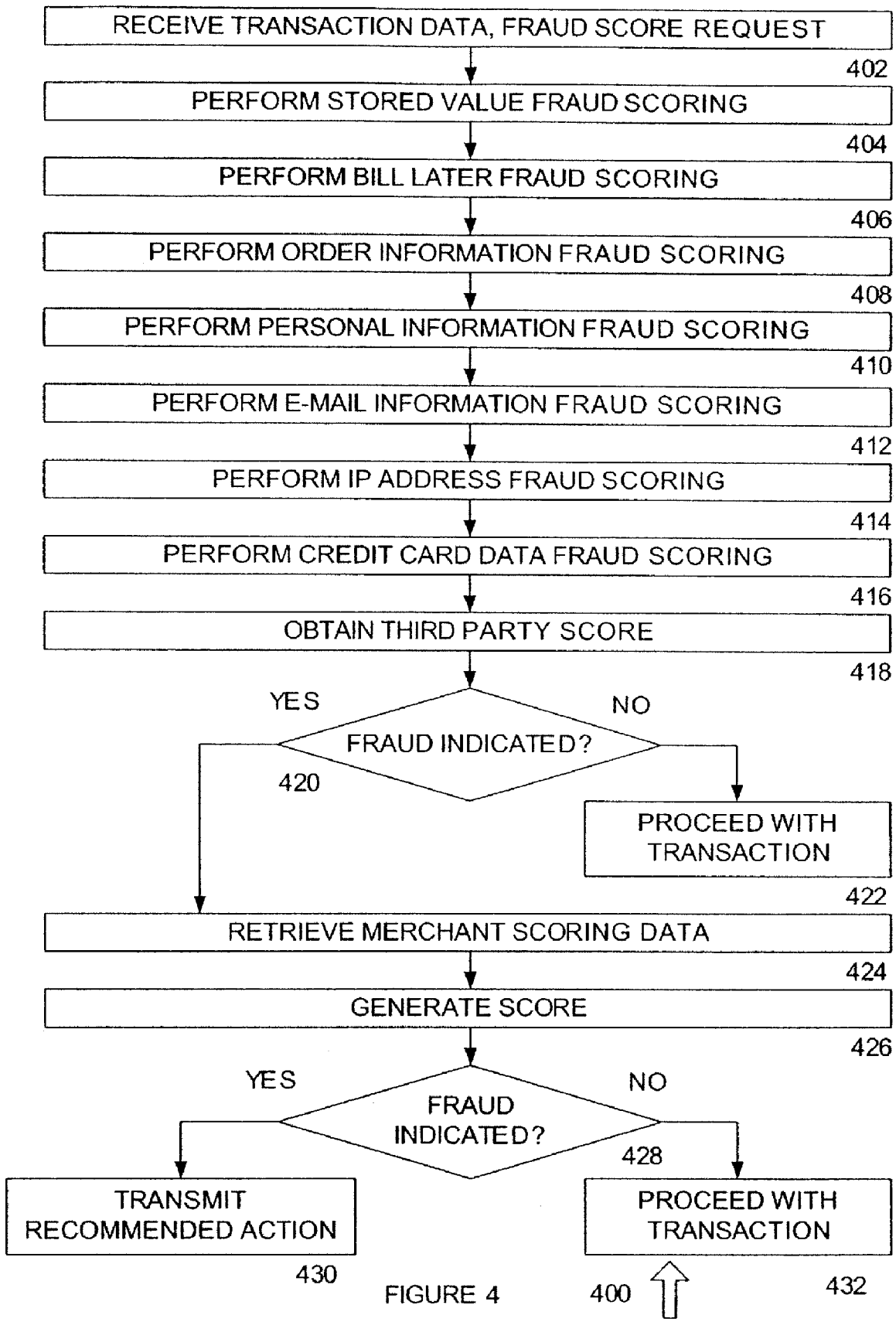
FIG. 4 is a flow chart of a method for performing transaction fraud screening in accordance with an exemplary embodiment of the present invention.

FIG. 4 is a flow chart of a method 400 for performing transaction fraud screening in accordance with an exemplary embodiment of the present invention. Method 400 begins at 402 where transaction data, such as credit card data, and a fraud score request are received. In one exemplary embodiment, a payment processing system can receive a large number of transactions, such as credit card transactions, stored value transactions, debit card transactions, electronic funds transfer transactions, or other suitable transactions, where such transactions either may or may not indicate that fraud processing should be performed. The method then proceeds to 404.

At 404 stored value fraud scoring is performed. In one exemplary embodiment, the transaction data and/or fraud score data may indicate that fraud score processing should be performed that includes stored value data and other suitable data. Merchant customization data and rules can also be applied to the stored value fraud scoring. Likewise, if it is determined that stored value fraud scoring is not required, the method proceeds to 406.

At 406 bill later fraud scoring is performed. In one exemplary embodiment, the transaction data and/or fraud score data may include a fraud scoring indicator that indicates that bill later fraud scoring is to be performed using bill later data and other suitable data. Merchant customization data and rules can also be applied to the bill later fraud scoring. If no bill later fraud scoring is to be performed the method proceeds to 408.

At 408 order information fraud scoring is performed. In one exemplary embodiment, the transaction data and/or fraud score data may include a fraud scoring indicator that indicates that order information fraud scoring is to be performed using order information data and other suitable data. Merchant customization data and rules can also be applied to the order information fraud scoring. If no order information fraud scoring is to be performed the method proceeds to 410.

At 410 personal information fraud scoring is performed. In one exemplary embodiment, the transaction data and/or fraud score data may include a fraud scoring indicator that indicates that personal information fraud scoring is to be performed using personal data and other suitable data. Merchant customization data and rules can also be applied to the personal information fraud scoring. If no personal information fraud scoring is to be performed the method proceeds to 412.

At 412 e-mail information fraud scoring is performed. In one exemplary embodiment, the transaction data and/or fraud score data may include a fraud scoring indicator that indicates that e-mail fraud scoring is to be performed using e-mail data and other suitable data. Merchant customization data and rules can also be applied to the e-mail information fraud scoring. If no e-mail information fraud scoring is to be performed the method proceeds to 414.

At 414 IP address fraud scoring is performed. In one exemplary embodiment, the transaction data and/or fraud score data may include a fraud scoring indicator that indicates that IP address fraud scoring is to be performed using IP address data and other suitable data. Merchant customization data and rules can also be applied to the IP address fraud scoring. If no IP address fraud scoring is to be performed the method proceeds to 416.

At 416 credit card data fraud scoring is performed. In one exemplary embodiment, the transaction data and/or credit card data may include a fraud scoring indicator that indicates that credit card data fraud scoring is to be performed using credit card data and other suitable data. Merchant customization data and rules can also be applied to the credit card data fraud scoring. If no credit card data fraud scoring is to be performed the method proceeds to 418. Alternatively, fraud scoring at 404 through 416 can be combined into a single fraud scoring transaction using a suitable combination of data, including individual data fields from one or more format sets where suitable.

At 418, a third party score is obtained. In one exemplary embodiment, a third party fraud processor can be used to obtain fraud scores. In this exemplary embodiment, the data to be provided to the third party fraud processor can first checked to ensure that it is in a proper format, and can then be checked to ensure that proper data fields have been provided, so as to implement both format and rules processing. The data can then be provided to the third party, and appropriate fraud processing data from the third party can be obtained. In one exemplary embodiment, the response can include a score from 1 to 999, predetermined codes, or other suitable scores. The method then proceeds to 420. Likewise, internal fraud scoring can be implemented.

At 420 it is determined whether fraud is indicated. If no fraud is indicated the method proceeds to 422 and transaction processing proceeds. Otherwise, the method proceeds to 424 where merchant scoring data is retrieved. In one exemplary embodiment, merchant scoring data can include predetermined transaction score ranges for each merchant, predetermined transaction score codes for each merchant, or other suitable data that is used to determine whether fraud has been indicated on a merchant by merchant basis. The method then proceeds to 426.

At 426 a score is generated, such as "accept transaction," "deny transaction," "obtain further information," or other suitable scores. Likewise, associated identifiers for such scores can also be used. The method then proceeds to 428.

At 428 it is determined whether fraud has been indicated, such as at a merchant system. In one exemplary embodiment, the scores generated at 426 can be used to generate merchant notification data. If it is determined at 428 that fraud has not been indicated the method proceeds to 432 and the transaction continues. Otherwise, the method proceeds to 430 where a recommended action is transmitted. In one exemplary embodiment, the recommended action can be to deny the transaction, to obtain additional data, or to perform other suitable processes.

In operation, method 400 allows transactions to be processed to obtain fraud score data using data formats and rules. Method 400 further allows fraud scoring data to be reduced to predetermined classes, so as to allow merchants to receive fraud processing instructions in accordance with specific rules for that merchant, to avoid the need to reconfigure merchant processing rules when fraud scoring data is modified or supplemented, and to provide other suitable advantages.

Figure 5:
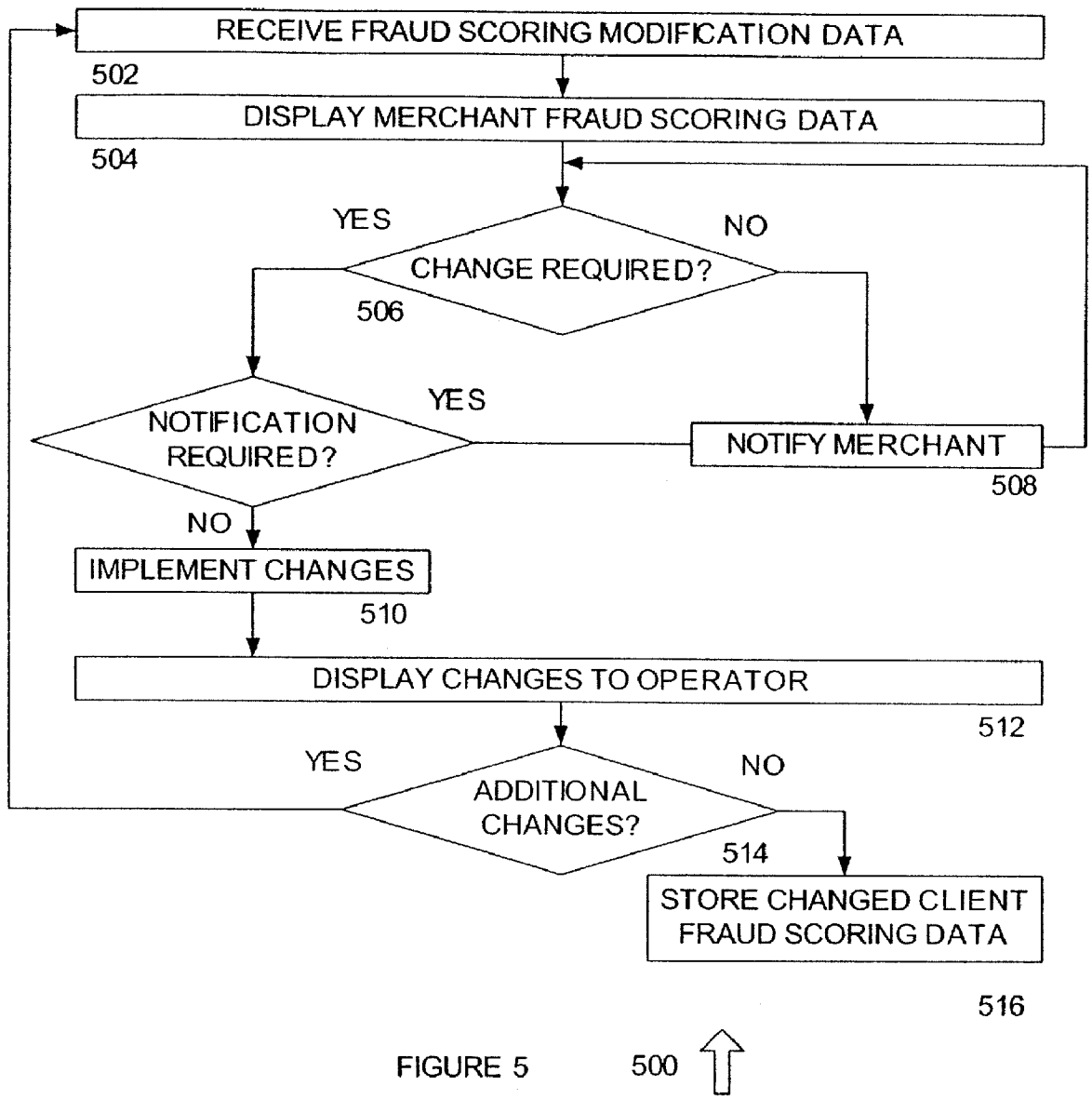
FIG. 5 is a flow chart of a method for performing merchant fraud policy management in accordance with an exemplary embodiment of the present invention.

FIG. 5 is a flow chart of a method 500 for performing merchant fraud policy management in accordance with an exemplary embodiment of the present invention. Method 500 begins at 502 where fraud scoring modification data is received. In one exemplary embodiment, the fraud scoring modification data can include data received from a third party transaction or fraud processor or other suitable sources that indicate that a change to merchant fraud scoring rules may be required. The method then proceeds to 504. At 504 merchant fraud scoring data is displayed. For example, if it is determined that the fraud scoring modification data cannot be handled without operator review or input, then the merchant fraud scoring data can be displayed. Otherwise the method can proceed directly to 506.

At 506 it is determined whether a change in the merchant fraud scoring data is required. In one exemplary embodiment, a change can be required if additional data fields have been provided that may be of interest to a merchant, if existing data fields have been changed to add subsets or otherwise alter the data fields in a manner that requires action, or if other changes have been made. If it is determined at 506 that change is not required the method proceeds to 508 where the merchant is notified. In one exemplary embodiment, the merchant can be notified of the decision not to implement a change, so as to provide the merchant an opportunity to request that a change be made or that other suitable actions be implemented. The method can then return to 506, such as where a merchant transmits data requesting that a change be performed.

If it is determined at 506 that a change is required, the method proceeds to 510 where it is determined whether notification is required. In one exemplary embodiment, notification can be required if the change is made to one or more predetermined data fields. If notification is required, the method proceeds to 508. Otherwise the method proceeds to 512.

At 512 the changes to the merchant fraud scoring data are implemented. In one exemplary embodiment, the changes can be implemented automatically, can be entered on a merchant-by-merchant basis, can be entered for all merchants in a class, or other suitable processes can be used. The method then proceeds to 514.

At 514 the changes implemented to the merchant fraud scoring data are displayed to an operator. In one exemplary embodiment, the changes can be displayed in a manner that requests that the operator verify whether any additional changes are required. If it is determined at 516 that additional changes are required the method returns to 502. Otherwise the method proceeds to 518 where the modified client fraud scoring data is stored for subsequent use.

In operation, method 500 allows merchant fraud scoring to be processed through a centralized transaction processor, such as to allow a plurality of merchants to either request fraud scoring data, not request fraud scoring data, and to request fraud scoring data having different rules. Method 500 thus allows modifications to the merchant fraud scoring data to be made based on changes in external fraud scoring systems, internal fraud scoring systems, individual merchant policies, or in other suitable manners.

Although preferred and exemplary embodiments of a system and apparatus of the present invention have been described in detail herein, those skilled in the art will also recognize that various substitutions and modifications can be made to the systems and methods without departing from the scope and spirit of the appended claims.

What is claimed is:

1. A method for processing transaction data comprising:
   electronically receiving order information fraud processing rule data for each of a plurality of merchants;
   electronically receiving transaction data for one of the merchants;
   transmitting the order information fraud processing rule data for the merchant and the transaction data to a fraud scoring system using electronic data transmitting equipment; and
   generating at the fraud scoring system, fraud score data based on the order information fraud processing rule data and the transaction data.

2. The method of claim 1 wherein receiving order information fraud processing rule data further comprises receiving personal information fraud processing rule data from each of the plurality of merchants.

3. The method of claim 1 wherein receiving order information fraud processing rule data further comprises receiving email address fraud processing rule data from each of the plurality of merchants.

4. The method of claim 1 herein receiving order information fraud processing rule data further comprises receiving IP address fraud processing rule data from each of the plurality of merchants.

5. The method of claim 1 wherein receiving order information fraud processing rule data further comprise receiving bill later fraud processing rule data from each of the plurality of merchants.

6. The method of claim 1 wherein receiving order information fraud processing rule data further comprises receiving stored value fraud processing rule data from each of the plurality of merchants.

7. The method of claim 1 further comprising:
   receiving fraud scoring update data; and
   generating notification data to one or more of the plurality of merchants.

8. The method of claim 1 further comprising:
   receiving fraud scoring update data; and
   modifying fraud processing rule data for each of the plurality of merchants.

9. A method for processing transaction data comprising:
   providing merchant fraud policy data for one of a plurality of merchants;

electronically receiving order information data and the merchant fraud policy data and generating order information fraud score data therefrom;

receiving the order information fraud score data and the merchant fraud policy data;

generating client authorization data using electronic data processing equipment based on the order information fraud score data and the merchant fraud policy data.

10. The method of claim 9 further comprising:

receiving personal data and generating personal fraud score data therefrom; and generating the client authorization data based on the personal fraud score data.

11. The method of claim 9 further comprising:

receiving email address data and generating email address fraud score data therefrom; and generating the client authorization data based on the email address fraud score data.

12. The method of claim 9 further comprising:

receiving IP address data and generating IP address fraud score data therefrom; and receiving the IP address fraud score data and generating the client authorization data based on the IP address fraud score data.

13. The method of claim 9 further comprising:

receiving stored value card data and generating stored value card fraud score data therefrom; and receiving the stored value card fraud score data and generating the client authorization data based on the stored value card fraud score data.

14. The method of claim 9 further comprising:

receiving bill later data and generating bill later fraud score data therefrom; and receiving the bill later fraud score data and generating the client authorization data based on the bill later fraud score data.

15. The method of claim 9 further comprising receiving fraud scoring update data and generating merchant notification data.

16. The method of claim 9 further comprising:

receiving fraud scoring update data and generating merchant fraud policy change data for one of the plurality of merchants; and receiving the merchant fraud policy change data and modifying merchant fraud data.

17. A method for processing transaction data comprising:

electronically receiving order information fraud processing rule data and personal information fraud processing rule data for each of a plurality of merchants;

electronically receiving transaction data for one of the merchants;

transmitting the order information fraud processing rule data for the merchant and the transaction data to a fraud scoring system using electronic data transmitting equipment;

receiving fraud score data; and receiving fraud scoring update data.

18. The method of claim 17 wherein receiving order information fraud processing rule data further comprises receiving email address fraud processing rule data from each of the plurality of merchants.

19. The method of claim 17 wherein receiving order information fraud processing rule data further comprises receiving IP address fraud processing rule data from each of the plurality of merchants.

20. The method of claim 17 wherein receiving order information fraud processing rule data further comprises receiving stored value fraud processing rule data from each of the plurality of merchants.

* * * * *

UNITED STATES PATENT AND TRADEMARK OFFICE
CERTIFICATE OF CORRECTION

| | | |
|---|---|---|
| PATENT NO. | : 8,036,981 B2 | Page 1 of 1 |
| APPLICATION NO. | : 12/697915 | |
| DATED | : October 11, 2011 | |
| INVENTOR(S) | : John Earl Shirey and Tonya Lin Carroll | |

It is certified that error appears in the above-identified patent and that said Letters Patent is hereby corrected as shown below:

Column 12, line 45, replace "herein" with "wherein"

Signed and Sealed this
Fifteenth Day of November, 2011

David J. Kappos
*Director of the United States Patent and Trademark Office*